(12) United States Patent
Senkfor et al.

(10) Patent No.: US 7,928,160 B2
(45) Date of Patent: *Apr. 19, 2011

(54) COATING COMPOSITION OF POLYUREA, POLYURETHANE AND FLAME RETARDANT

(75) Inventors: Howard Senkfor, South Euclid, OH (US); Paul P. Greigger, Cranberry Township, Butler County, PA (US); Thomas R. Hockswender, Gibsonia, PA (US); Dan M. Bratys, Willoughby, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/460,439

(22) Filed: Jul. 27, 2006

(65) Prior Publication Data

US 2010/0239815 A1 Sep. 23, 2010

Related U.S. Application Data

(63) Continuation-in-part of application No. 11/211,188, filed on Aug. 25, 2005, now Pat. No. 7,611,772.

(51) Int. Cl.
*C08K 5/5313* (2006.01)
*C08L 75/02* (2006.01)

(52) U.S. Cl. .......................................... 524/590; 525/457

(58) Field of Classification Search .................... 525/453
See application file for complete search history.

(56) References Cited

U.S. PATENT DOCUMENTS

| | | | | |
|---|---|---|---|---|
| 3,012,008 A | * | 12/1961 | Lister | 528/67 |
| 4,581,433 A | * | 4/1986 | Potter et al. | 528/64 |
| 4,719,132 A | * | 1/1988 | Porter, Jr. | 427/409 |
| 4,904,705 A | * | 2/1990 | Gerkin et al. | 521/163 |
| 6,013,755 A | | 1/2000 | Primeaux, II et al. | 528/68 |
| 6,365,071 B1 | * | 4/2002 | Jenewein et al. | 252/609 |
| 6,403,752 B1 | | 6/2002 | House et al. | 528/64 |
| 6,613,389 B2 | | 9/2003 | Li et al. | 427/388.1 |
| 2003/0047836 A1 | | 3/2003 | Rickner et al. | 264/235 |
| 2003/0105220 A1 | | 6/2003 | Gupta et al. | 524/589 |
| 2003/0118739 A1 | | 6/2003 | Li et al. | 427/421 |
| 2004/0005413 A1 | | 1/2004 | Li et al. | 427/421 |
| 2005/0004277 A1 | * | 1/2005 | Hoerold et al. | 524/99 |
| 2005/0109994 A1 | * | 5/2005 | Matheson et al. | 252/609 |
| 2006/0046068 A1 | | 3/2006 | Barancyk et al. | 428/423.1 |

FOREIGN PATENT DOCUMENTS

| | | |
|---|---|---|
| EP | 0 517 466 A2 | 6/1992 |
| EP | 0 287 192 A2 | 2/1998 |
| WO | WO 02/28935 A1 | 4/2002 |
| WO | WO 02/102869 A1 | 12/2002 |

OTHER PUBLICATIONS

Gachter, R. and Muller, H, eds. Plastics Additive Handbook, 4$^{th}$ ed. Hanser Publishers, New York, NY: 1993. pp. 543-544.*

* cited by examiner

*Primary Examiner* — Robert Sellers
(74) *Attorney, Agent, or Firm* — Diane R. Meyers; Krisanne Shideler

(57) ABSTRACT

The present invention is directed to a coating composition comprising polyurea and polyurethane. Further, the present invention is directed to a coating composition comprising polyurea or, polyurea and polyurethane, and flame retardant. The polyurea is formed from a reaction mixture comprising isocyanate and amine wherein the ratio of equivalents of isocyanate groups to equivalents of amine groups is greater than 1 and the isocyanate-functional component and the amine-functional component can be applied to a substrate at a volume mixing ratio of 1:1.

26 Claims, 1 Drawing Sheet

COATING COMPOSITION OF POLYUREA, POLYURETHANE AND FLAME RETARDANT

CROSS-REFERENCE TO RELATED APPLICATIONS

This patent application is a Continuation-In-Part (CIP) of patent application having Ser. No. 11/211,188 filed on Aug. 25, 2005, now U.S. Pat. No. 7,611,772, hereby incorporated by reference in its entirety.

FIELD OF THE INVENTION

The present invention is directed to a coating composition comprising polyurea and polyurethane. The present invention is further directed to a coating composition comprising polyurea or polyurea and polyurethane, and flame retardant.

BACKGROUND

Coating compositions are used in a wide variety of industries. Such industries may include but are not limited to landcraft such as cars, trucks, sport utility vehicles, motorcycles; watercraft such as boats, ships and submarines; aircraft such as airplanes and helicopters, industrial such as commercial equipment and structures including walls and roofs; construction such as construction vehicles and structures including walls and roofs, military such as military vehicles, for example tanks and humvees, and military structures including walls and roofs, for examples, ammunition cases and battery enclosures; and the like. In these industries, considerable efforts have been expended to develop coating compositions with improved properties. Coatings are used to protect various components against damage due to corrosion, abrasion, impact, chemicals, ultraviolet light, flame and heat, and other environmental exposure. Coatings may also be used for ballistic and blast mitigation purposes. Additionally, coatings such as those imparting color and/or high gloss can be used as decorative coatings.

Certain polyurea coatings have been known to have deficiencies that inhibit their effectiveness in providing adequate protection to the substrate or in improving properties of the substrate. For example, polyureas and polyurethanes may be combustible materials and thus, may not exhibit desirable flame and heat resistance in some applications.

Accordingly, it is desirable to provide polyurea and polyurethane coating compositions that provide adequate protection to a substrate or improve the properties of the substrate; and such compositions containing flame retardant that may exhibit improved flame and/or heat resistant properties.

SUMMARY OF THE INVENTION

The present invention is directed to a coating composition comprising a) polyurea formed from a reaction mixture comprising isocyanate and amine wherein the ratio of equivalents of isocyanate groups to equivalents of amine groups is greater than 1 and the isocyanate and the amine can be applied to a substrate at a volume mixing ratio of 1:1; and b) polyurethane.

The present invention is also directed to a coating composition comprising a) polyurea formed from a reaction mixture comprising isocyanate and amine wherein the ratio of equivalents of isocyanate groups to equivalents of amine groups is greater than 1 and the isocyanate and the amine can be applied to a substrate at a volume mixing ratio of 1:1; and b) flame retardant, and optionally polyurethane.

The present invention is further directed to a coated article comprising a substrate at least partially coated with at least one of the above-described coating compositions of the present invention.

Moreover, the present invention is directed to a method of forming a coated article comprising providing a substrate and depositing a first layer from a first coating composition on at least a portion of the substrate and a second layer from a second coating composition applied over at least a portion of the first layer wherein at least one of the first composition or the second composition includes at least one of the above-described coating compositions of the present invention.

DETAILED DESCRIPTION OF THE INVENTION

Figure 1:
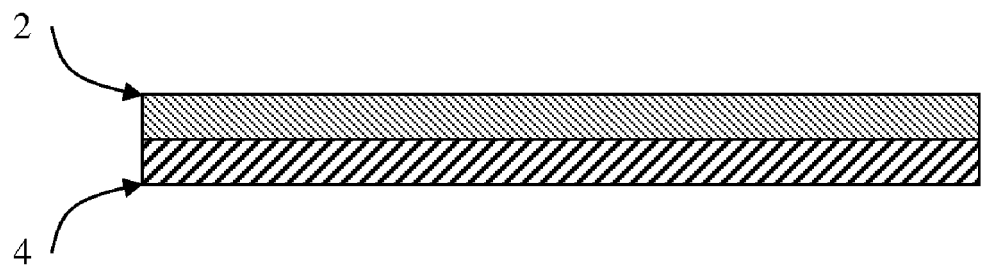
FIG. 1 is a composite article according to an embodiment of the invention including a metal foil carrier film having a coating layer on one side.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The present invention is directed to a coating composition comprising polyurea or, polyurea and polyurethane. The polyurea is formed by the reaction product of isocyanate and amine. The ratio of equivalents of isocyanate groups to equivalents of amine groups is greater than 1 and the isocyanate and the amine reaction product can be applied to a substrate at a volume mixing ratio of 1:1.

In another embodiment, the coating composition of the present invention can include flame and/or heat resistant material. The presence of such material results in a coating composition which may exhibit improved flame and/or heat resistance. As used herein, the terms "improved flame resistance" and "improved heat resistance" means any degree of improved flame resistance or heat resistance, respectively, that is demonstrated by a coating composition with flame and/or heat resistant material as compared to a coating composition without flame and/or heat resistant material.

As used herein, the term "isocyanate" includes unblocked compounds capable of forming a covalent bond with a reactive group such as a hydroxyl or amine functional group. In alternate non-limiting embodiments, the isocyanate of the present invention can be monomeric containing one isocyanate functional group (NCO) or the isocyanate of the present invention can be polymeric containing two or more isocyanate functional groups (NCOs).

Suitable isocyanates for use in the present invention are numerous and can vary widely. Such isocyanates can include those that are known in the art. Non-limiting examples of suitable isocyanates can include monomeric and/or polymeric isocyanates. The polyisocyanates can be selected from monomers, prepolymers, oligomers, or blends thereof. In an embodiment, the polyisocyanate can be $C_2$-$C_{20}$ linear, branched, cyclic, aromatic, or blends thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof.

In a non-limiting embodiment, polyisocyanate monomer may be used. It is believed that the use of a polyisocyanate monomer (i.e., residual-free monomer from the preparation of prepolymer) may decrease the viscosity of the polyurea composition thereby improving its flowability, and may provide improved adhesion of the polyurea coating to a previously applied coating and/or to an uncoated substrate. In alternate embodiments of the present invention, at least 1 percent by weight, or at least 2 percent by weight, or at least 4 percent by weight of the isocyanate component comprises at least one polyisocyanate monomer. In a further embodiment of the invention, isocyanate can include oligomeric polyisocyanate such as but not limited to dimers, trimers, and polymeric oligomers, and modified polyisocyanates such as but not limited to carbodiimides and uretone-imines; and mixtures thereof.

As used herein, "prepolymer" means polyisocyanate which is pre-reacted with polyamine or other isocyanate reactive group such as polyol. Suitable polyisocyanates include those previously disclosed herein. Suitable polyamines may be numerous and selected from a wide variety known in the art. Non-limiting examples of suitable polyamines may include but are not limited to primary, secondary and tertiary amines, and mixtures thereof. Further examples may include those disclosed herein. Suitable polyols may be numerous and selected from a wide variety known in the art. Non-limiting examples of suitable polyols may include but are not limited to polyether polyols, polyester polyols, polycaprolactone polyols, polycarbonate polyols, polyurethane polyols, poly vinyl alcohols, polymers containing hydroxy functional acrylates, polymers containing hydroxy functional methacrylates, polymers containing allyl alcohols and mixtures thereof.

Suitable amines for use in the present invention can be selected from a wide variety of known amines such as primary and secondary amines, and mixtures thereof. In alternate embodiments, the amine may include monoamines, or polyamines having at least two functional groups such as di-, tri-, or higher functional amines; and mixtures thereof. In further embodiments, the amine may be aromatic or aliphatic such as cycloaliphatic, or mixtures thereof. Non-limiting examples of suitable amines may include aliphatic polyamines such as but not limited to ethylamine, isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Non-limiting examples of secondary amines can include mono- and poly-acrylate and methacrylate modified amines; polyaspartic esters which can include derivatives of compounds such as maleic acid, fumaric acid esters, aliphatic polyamines and the like; and mixtures thereof. In an embodiment of the present invention, the secondary amine includes an aliphatic amine, such as a cycloaliphatic diamine. Such amines are available commercially from Huntsman Corporation (Houston, Tex.) under the designation of JEFFLINK such as JEFFLINK 754.

In another embodiment, the amine can include an amine-functional resin. Suitable amine-functional resins can be selected from a wide variety known in the art and can include those having relatively low viscosity. In a non-limiting embodiment, the amine-functional resin may be an ester of an organic acid, for example, an aspartic ester-based amine-functional reactive resin that is compatible with isocyanate. In a further embodiment, the isocyanate may be solvent-free, and/or has a mole ratio of amine-functionality to the ester of no more than 1:1 so that no excess primary amine remains upon reaction. A non-limiting example of such polyaspartic esters may include the derivative of diethyl maleate and 1,5-diamino-2-methylpentane, which is available commercially from Bayer Corporation of Pittsburgh, Pa. under the trade name DESMOPHEN NH1220. Other suitable compounds containing aspartate groups may be employed as well.

In a non-limiting embodiment, the amine may include high molecular weight primary amine, such as but not limited to polyoxyalkyleneamine. Suitable polyoxyalkyleneamines may contain two or more primary amino groups attached to a backbone derived, for example, from propylene oxide, ethylene oxide, or mixtures thereof. Non-limiting examples of such amines may include those available under the designation JEFFAMINE from Huntsman Corporation. In an embodiment, such amines may have a molecular weight ranging from 200 to 7500, such as but not limited to JEFFAMINE D-230, D-400, D-2000, T-403 and T-5000.

In another embodiment, the amine for use in the present invention can include the reaction product of primary amine with monoepoxide to produce secondary amine and reactive hydroxyl group.

In a further embodiment, the amine component may be a mixture of primary and secondary amines wherein the primary amine may be present in an amount of from 20 to 80 percent by weight or from 20 to 50 percent by weight, with the balance being secondary amine. In other embodiments, the primary amines present in the composition may have a molecular weight greater than 200, and the secondary amines present may include diamine having molecular weight of at least 190, or from 210 to 230.

In a further embodiment, the amine component may not include primary amine.

In another embodiment, the amine component may include at least one secondary amine which may be present in an amount of from 20 to 80 percent by weight or 50 to 80 percent by weight.

In another embodiment, the amine component may include aliphatic amine. It is believed that the presence of aliphatic amine may provide enhanced durability. In this embodiment, the amine typically is provided as a liquid having a relatively low viscosity, for example, less than about 100 mPa·s at 25° C.

In an embodiment, the coating composition of the present invention may include a blend of polyurea and polyurethane. It will be appreciated by those skilled in the art that polyurethane can be formed as a by-product in the production of the polyurea. In alternate embodiments, the polyurethane can be formed in-situ and/or it can be added to the reaction mixture during formation of the polyurea. A non-limiting example of polyurethane formed in-situ may include the reaction product of polyisocyanate and hydroxyl-functional material. Non-limiting examples of suitable polyisocyanates may include those described herein. Non-limiting examples of suitable hydroxyl-functional material may include polyol such as those described herein. Another example of polyurethane formed in-situ may include the reaction product of prepolymer and isocyanate-functional material. Suitable examples of these reactants may include those described herein.

The coating composition of the present invention may be formulated and applied using various techniques known in the art. In an embodiment, conventional spraying techniques may be used. In this embodiment, the isocyanate and amine may be combined such that the ratio of equivalents of isocyanate groups to equivalents of amine groups is greater than 1 and the isocyanate and amine can be applied to a substrate at a volume mixing ratio of 1:1; and the reaction mixture may be applied to an uncoated or coated substrate to form a first coating on the uncoated substrate or a subsequent coating on the coated substrate.

In an embodiment, the sprayable coating composition may be prepared using a two-component mixing device. In this embodiment, isocyanate and amine are added to a high pressure impingement mixing device. The isocyanate is added to the "A-side" and amine is added to the "B-side". The A- and B-side streams are impinged upon each other and immediately sprayed onto at least a portion of an uncoated or coated substrate. The isocyanate and the amine react to produce a coating composition which is cured upon application to the uncoated or coated substrate.

The volume mixing ratio of the isocyanate and amine may be such that the resulting isocyanate and amine reaction mixture can be applied to a substrate at a volume mixing ratio of 1:1.

It is believed that the ratio of equivalents of isocyanate groups to amine groups may be selected to control the rate of cure of the coating composition of the present invention. It has been found that cure and adhesion advantages may result when applying the coating in a 1:1 volume ratio wherein the ratio of the equivalents of isocyanate groups to amine groups (also known as the reaction index) is greater than one, such as from 1.01 to 1.10:1, or from 1.03 to 1.10:1, or from 1.05 to 1.08:1. The term "1:1 volume ratio" means that the volume ratio varies by up to 20% for each component, or up to 10% or up to 5%.

In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers, are impacted or impinged upon each other at high velocity, to mix the two components and form a coating composition, which may be applied to an uncoated or coated substrate using the spray gun. The mixing forces experienced by the component streams may be depend upon the volume of each stream entering the mixing chamber per unit time and the pressure at which the component streams are delivered. A 1:1 volume ratio of the isocyanate and amine per unit time may equalize these forces.

Another suitable application device known in the industry includes a "static mix tube" applicator. In this device, the isocyanate and amine are each stored in a separate chamber. As pressure is applied, each of the components is brought into a mixing tube in a 1:1 ratio by volume. Mixing of the components is effected by way of a torturous or cork screw pathway within the tube. The exit end of the tube may have atomization capability useful in spray application of the reaction mixture. Alternatively, the fluid reaction mixture may be applied to a substrate as a bead. A static mix tube applicator is commercially available from Cammda Corporation.

The coating composition of the present invention may be applied to a wide variety of substrates. Non-limiting examples of suitable substrates can include but are not limited to metal, natural and/or synthetic stone, ceramic, glass, brick, cement, concrete, cinderblock, wood and composites and laminates thereof; wallboard, drywall, sheetrock, cement board, plastic, paper, PVC, Styrofoam, plastic composites, acrylic composites, asphalt, fiberglass, soil, gravel and the like. Further, the coating composition of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. As used herein, "ballistic mitigation" refers to reducing or alleviating the effects of a bullet or other type of firearm ammunition. As used herein, "blast mitigation" refers to reducing or alleviating the secondary effects of a blast. In non-limiting examples, the coating composition of the present invention can be applied to at least a portion of the following substrates: an article of manufacture such as but not limited to land-, water-, air- and military-vehicles, for example, trucks, boats, ships, submarines, airplanes, helicopters, humvees and tanks; and at least a portion of a structure including commercial and military structures, for example, roofs, floors, support beams, walls and the like. As used herein, the term "substrate" may refer to a surface on at least a portion of an article or the article itself which comprises the substrate.

In an embodiment, the coating composition of the present invention may be applied to a carrier film. The carrier film can be selected from a wide variety of such materials known in the art. Non-limiting examples of suitable carrier films may include, but are not limited to thermoplastic materials, thermosetting materials, metal foils, cellulosic paper, synthetic papers, and mixtures thereof. As used herein, the term "thermoplastic material" refers to any material that is capable of softening or fusing when heated and of solidifying (hardening) again when cooled. Non-limiting examples of suitable thermoplastic materials may include polyolefins, polyurethanes, polyesters, polyamides, polyureas, acrylics, and mixtures thereof. As used herein, the term "thermosetting material" refers to any material that becomes permanently rigid after being heated and/or cured. Non-limiting examples may include polyurethane polymers, polyester polymers, polyamide polymers, polyurea polymers, polycarbonate polymers, acrylic polymers, resins, copolymers thereof, and mixtures thereof. As used herein, the term "foil" refers to a thin and flexible sheet of metal. Non-limiting examples may include aluminum, iron, copper, manganese, nickel, combinations thereof, and alloys thereof. This embodiment is shown in FIG. 1, where metal foil carrier film 4 is coated by coating layer 2. As used herein, the term "synthetic paper" refers to synthetic plain or calendered sheets that can be coated or uncoated and are made from films containing polypropylene, polyethylene polystyrene, cellulose esters, polyethylene terephthalate, polyethylene naphthalate, poly 1,4-cyclohexanedimethylene terephthalate, polyvinyl acetate, polyimide, polycarbonate, and combinations and mixtures thereof. A non-limiting example of suitable synthetic paper is available under the tradename TESLIN from PPG Industries, Inc., Pittsburgh, Pa.

Figure 2:
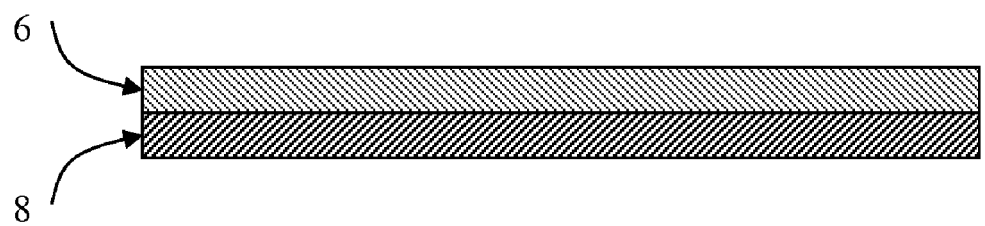
FIG. 2 is a composite article according to an embodiment of the invention including a plastic or synthetic paper carrier film having a coating layer on one side.

In an embodiment, a carrier film having a first and second major surface may serve as a substrate and the coating composition of the present invention may be applied to the first surface of the film to form a coating layer. A further embodiment is shown in FIG. 2, where carrier film 8 is a thermoplastic material, a thermosetting material, or a synthetic paper, which is coated by coating layer 6.

In alternate embodiments, the carrier film may have a film thickness of at least 0.5 µm, or at least 1 µm, or at least 2 µm, or at least 3 µm or at least 5 µm. In other embodiments, the carrier film may have a thickness of up to 100 µm, or up to 90 µm, or up to 75 µm, or up to 50 µm, or up to 40 µm thick. The carrier film can vary and range between any thickness recited above provided that the carrier film can adequately support the coating layer and is sufficiently flexible for a desired end use application.

In another embodiment, the carrier film may include an adhesive layer superimposed on the second surface of the film. Any suitable adhesive composition known in the art can be used to form the adhesive layer. Suitable adhesive compositions include those that contain at least one acrylic latex polymer prepared from a monomer composition that includes $C_1$-$C_5$ linear, branches, or cyclic alkyl (meth)acrylate monomers.

Figure 3:
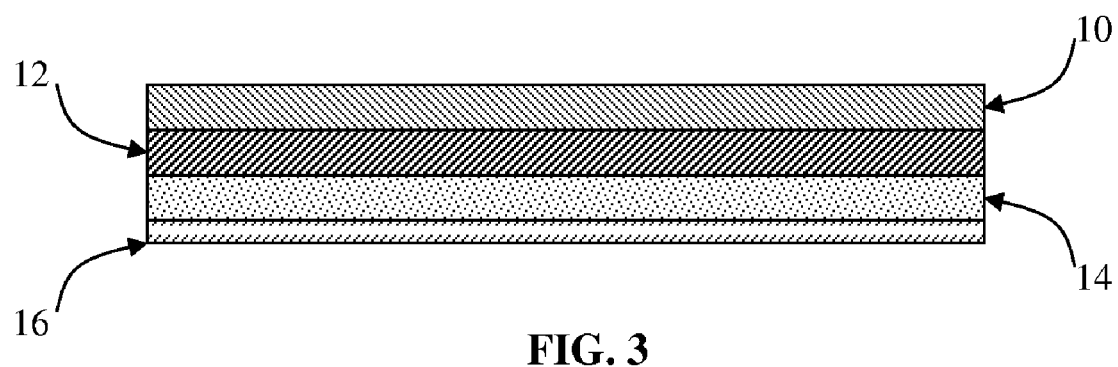
FIG. 3 is a composite article according to an embodiment of the invention including a plastic or synthetic paper carrier film having a coating layer on one side, an adhesive layer on the other side, and a protective layer over the adhesive layer.

In a further embodiment, a temporary protective cover may be superimposed over the adhesive layer. Any suitable material can be used as the protective cover. Suitable materials include, but are not limited to, paper and polymeric materials. This embodiment may include the composite shown in FIG. 3, where carrier film 12 is a thermoplastic material, a thermosetting material, or a synthetic paper, which is coated on a first side by coating layer 10. Adhesive layer 14 is coated on a second side of carrier film 12, which is in turn covered by protective layer 16. In these embodiments, the temporary protective cover can be removed and the second side of the carrier film may be applied or adhered to a desired substrate.

In alternate embodiments, the coating composition of the present invention may be applied to a bare (e.g., untreated, uncoated) substrate, a pretreated substrate and/or coated substrate having a first coating or subsequent coatings. In a non-limiting embodiment, the coating composition of the present invention may be applied to a multi-layer coating composite. The first coating applied to a substrate may be selected from a variety of coating compositions known in the art for surface coating substrates. Non-limiting examples may include but are not limited to electrodepositable film-forming compositions, primer compositions, pigmented or non-pigmented monocoat compositions, pigmented or non-pigmented base coat compositions, transparent topcoat compositions, industrial coating compositions, and the like. In another non-limiting embodiment, the coating composition of the present invention may be applied to a multi-layer coating composite comprising a pretreated substrate and coating layers such as but not limited to electrocoat, primer, base coat, clear coat, and combinations thereof.

In a further embodiment, the coating composition of the present invention can be used in a two-coat application resulting in a textured surface.

A first coat is applied to an uncoated or coated substrate to produce a smooth, substantially tack-free layer. The Tack-Free Method is used to determine if the layer is substantially tack-free. The Tack-Free Method includes spraying the coating composition in one coat onto a non-adhering plastic sheet to a thickness of from 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. The time beginning from the completion of spraying until when the coating is substantially tack-free is said to be the tack-free time. In a non-limiting embodiment, the tack-free time and the cure time may be controlled by balancing levels of various composition components such as the ratio of primary amine to secondary amine.

A second coat may then be applied to the first coating layer as a texturizing layer or "dust coating". The second coating layer can be applied by increasing the distance between the application/mixing device and the coated substrate to form discrete droplets of the coating composition prior to contacting the coated substrate thereby forming controlled non-uniformity in the surface of the second layer. The substantially tack-free first layer of the coating is at least partially resistant to the second layer; i.e., at least partially resistant to coalescence of the droplets of coating composition sprayed thereon as the second layer or dust coating such that the droplets adhere to but do not coalesce with the previous layer(s) to create surface texture. The final coating layer typically exhibits more surface texture than the first or previous coating layers. An overall thickness of the coating layers may range from 20 to 1000 mils, or from 40 to 150 mils, or from 60 to 100 mils (1524-2540 microns), or from 500 to 750 mils. In a non-limiting embodiment, the first layer may be the majority of the total thickness and the dust coating may be from 15-50 mils (381-1270 microns).

In various embodiments of the present invention, the "first" coating layer may comprise one, two, three or more layers; and the "second" coating layer may be one or more subsequent layers applied thereover. For example, four polyurea layers may be applied, with the fourth layer being the dust coating and each layer having a thickness of from 15 to 25 mil (381-635 microns).

In alternate embodiments, the coating layers may comprise the same or different polyurea or polyurea/polyurethane coating compositions. For example, the first layer may be a polyurea composition comprising aliphatic and/or aromatic amine and/or aliphatic and/or aromatic polyisocyanate; and the second layer may comprise the same or different combination of aliphatic and/or aromatic amine and/or aliphatic and/or aromatic polyisocyanate. In a further embodiment, the outermost coating layer may comprise a coating composition that provides a desired durability. The desired durability may depend upon the use of the coating composition of the present invention and/or the substrate to which it may be applied. In an embodiment, a combination of aliphatic and/or aromatic amine and/or polyisocyanate may be selected such that the composition of the outermost layer has substantial durability. For example, the outermost coating layer may have a durability of (provide durability measurement range) when tested using a Weatherometer in accordance with (provide standard Durability test reference). In this embodiment, the first layer may be a polyurea composition comprising polyisocyanate and amine, wherein at least one of the amine and/or polyisocyanate may be aromatic, and the second layer may be a polyurea composition comprising aliphatic amine and aliphatic polyisocyanate.

In other embodiments, the coating composition of the present invention may optionally include inert materials such as but not limited to fillers, flame retardants, fiberglass, stabilizers, thickeners, adhesion promoters, catalysts, pigments, other performance or property modifiers which are well known in the art of surface coatings, and mixtures thereof. In alternate embodiments, such additives may be combined with the isocyanate, the amine, or both. In a further embodiment, at least one of these materials is added to the amine prior to reaction with isocyanate.

In a non-limiting embodiment, the coating composition of the present invention may include flame and/or heat resistant material such as flame retardant. The flame retardant may be selected from a wide variety of flame retardants that are known in the art. Non-limiting examples of suitable flame retardants may include the flame retardant polymers disclosed in U.S. Pat. Nos. 6,015,510 (column 4, line 31 thru column 5, line 41) and 5,998,503 (column 4, line 31 thru column 5, line 41). Further suitable flame retardants may include halogenated phosphates or halogen free phosphates, powdered or fumed silica, layered silicates, aluminum hydroxide, brominated fire retardants, tris(2-chloropropyl) phosphate, tris(2,3-dibromopropyl)phosphate, tris(1,3-dichloropropyl)phosphate, diammonium phosphate, various halogenated aromatic compounds, antimony oxide, alumina trihydrate, polyvinyl chloride and the like, and mixtures thereof.

In an embodiment, the flame retardant component may include at least one phosphinic salt of the formula (I), and/or one diphosphinic salt of the formula (II), and/or polymers of these,

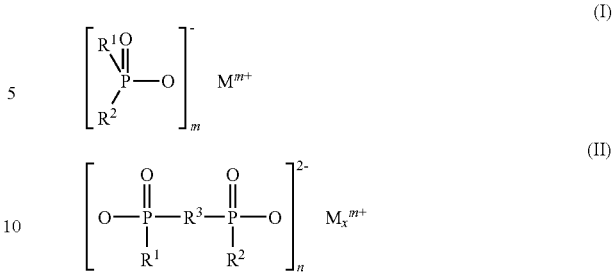

wherein $R^1$ and $R^2$ are identical or different and are $C_1$-$C_6$-alkyl, linear or branched, and/or aryl; $R^3$ is $C_1$-$C_{10}$-alkylene, linear or branched, $C_6$-$C_{10}$-arylene, -alkylarylene, or -arylalkylene; M is Mg, Ca, Al, Sb, Sn, Ge, Ti, Zn, Fe, Zr, Ce, Bi, Sr, Mn, Li, Na, K and/or a protonated nitrogen base; m is from 1 to 4; n is from 1 to 4; x is from 1 to 4, and also may include at least one synergistic halogen-containing component. The flame retardant component of this embodiment is further described in United States Patent Publication Nos. 2005/0004277A1 and 2005/0004278A1, from paragraph [0025] to paragraph [0070] in both applications.

In alternate embodiments, the flame retardant may optionally contain mineral oxides such as but not limited to zinc borate, barium metaborates, calcium borate, melamine cyanurate, melamine phosphates, polymelamine phosphates, melamine pyrophosphates, polymelamine pyrophosphates, melamine borate, other melamine derivatives and the like, and mixtures thereof.

The amount of the flame retardant present in the coating composition of the present invention can vary widely. In an embodiment, the flame retardant component constitutes from 5 to 35 percent by weight based on the total weight of reactants in the coating composition.

In another embodiment, the composition further comprises a filler such as but not limited to clay, silica or mixtures thereof. In a further embodiment, the filler is added to the amine. Such a coating composition has been found to have better adhesion to a metal substrate than a similar coating composition without clay or silica (as determined in accordance with the test method in ASTM D 1876, without use of a fixturing device).

The clay may be selected from any of a variety of clays known in the art including montmorillonite clays such as bentonite, kaolin clays, attapulgite clays, sepiolite clay, and mixtures thereof. Additionally, the clay may be surface treated as is known in the art. Any suitable surface treatment may be used. In a non-limiting embodiment, the clay is treated with one or more of the following amines:

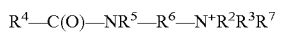

wherein $R^1$ and $R^4$ are independently $C_4$-$C_{24}$ linear, branched, or cyclic alkyl, aryl, alkenyl, aralkyl or aralkyl, $R^2$, $R^3$, $R^5$ and $R^7$ are independently H or $C_1$-$C_{24}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene.

In a non-limiting embodiment, surface treated bentonite as described in U.S. Pat. No. 3,974,125 may be used.

In an embodiment, the clay may be present in the coating composition of the present invention in an amount of at least 0.5 percent by weight, or at least 1 percent by weight, or at least 1.5 percent by weight. In other embodiments, the clay can be present in an amount of up to 6 percent by weight, or up to 5 percent by weight, or up to 4 percent by weight of the composition. The amount of clay in the coating composition can be any value or range between any values recited above, with the proviso that the adhesion properties and application viscosity of the coating composition are not adversely affected.

In another embodiment, the coating composition of the present invention may include silica. Any suitable silica can be used, provided that application and coating performance properties are not adversely impacted. The silica may be selected from surface-treated/surface-modified silica, untreated/unmodified silica and mixtures thereof. Non-limiting examples of suitable silica may include but are not limited to precipitated, fumed, colloidal and mixtures thereof. In alternate non-limiting embodiments, the silica may be present in an amount such that it constitutes at least 0.5 percent by weight, or at least 1 percent by weight, or at least 1.5 percent by weight of the coating composition. In other embodiments, the silica can be present such that it constitutes up to 6 percent by weight, or up to 5 percent by weight, or up to 4 percent by weight of the composition. The amount of silica in the two-component coating composition can be any value or range between any values recited above, provided that the adhesion properties and application viscosity of the coating composition are not adversely affected.

In another embodiment, the coating composition of the present invention may include an adhesion promoter which may enhance adhesion of the coating composition to a substrate. When the coating composition of the present invention is applied over a first coating, an adhesion promoter may be present in the first coating composition, or it may be added to the isocyanate and/or amine of the second coating composition, or it may be applied as a separate layer directly to the substrate or first coating prior to application of the second coating thereto. When applied as a separate layer, the adhesion promoter may be applied using a variety of conventional techniques such as but not limited to wiping, dipping, roll coating, curtain coating, spraying or the like.

Non-limiting examples of suitable adhesion promoters for use in the present invention may include amine-functional materials such as 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as POLYCAT 15 from Air Products and Chemicals, Inc.), blocked amines such as an adduct of IPDI and dimethylamine, tertiary amines, such as 1,5-diazabicyclo[4.3.0]non-5-ene, 1,8-diazabicyclo[5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene, amino silanes such as γ-aminopropyltriethoxysilane (commercially available as Silquest A100 from OSY Specialties, Inc.), melamine or amino melamine resin (e.g. Cymel 220 or Cymel 303, available from Cytec Industries Inc.), metal complexes including metal chelate complexes such as an aluminum chelate complex (e.g. K-KAT 5218 available from King Industries) or tin-containing compositions such as stannous octoate and organotin compounds such as dibutyltin dilaurate and dibutyltin diacetate, urethane acrylate compositions, salts such as chlorine phosphate, butadiene resins such as an epoxidized, hydroxyl terminated polybutadiene resin (e.g. POLY BD 605E available from Atofina Chemicals, Inc.), polyester polyols (e.g. CAPA 3091, a polyester triol available from Solvay America, Inc., and urethane acrylate compositions such as an aromatic urethane acrylate oligomer (e.g. CN999 available from Sartomer Company, Inc.); and mixtures thereof.

It is believed that the underlying mechanism which enhances adhesion may involve one or more phenomenon such as but not limited to catalysis of a reaction between reactive groups on the substrate or previously applied coating (e.g. hydroxyl groups) and functional groups of the coating composition, reaction with the substrate or bonding with the substrate such as via hydrogen bonding, although the inventors do not wish to be bound by any mechanism.

In an embodiment, the adhesion promoter comprises at least one component selected from melamine, urethane acrylate, metal chelate complex, salt, tin-containing compound and polyhydric polymer.

In another embodiment, the coating composition of the present invention may include one or more pigments. As previously described herein, pigment can include color or effect-enhancing pigments. Further, the pigment may be present in a first coating layer and/or second coating layer as part of a multi-layer coating composite. Suitable pigments can be selected from metallic pigments, organic color pigments, inorganic color pigments, or mixtures thereof. Non-limiting examples of suitable pigments can include but are not limited to metallic pigments such as aluminum flake, copper bronze flake and micaceous pigments such as metal oxide coated mica; non-metallic color pigments including inorganic pigments such as titanium dioxide, iron oxide, chromium oxide, lead chromate, and carbon black, and organic pigments such as phthalocyanine blue and phthalocyanine green; and mixtures thereof.

In an embodiment, the pigment can be present in each coating composition in an amount of from 1 to 80 percent by weight based on the total weight of coating solids. In another non-limiting embodiment, the metallic pigment can be present in an amount of from 0.5 to 25 percent by weight based on the total weight of coating solids.

In another embodiment, the coating composition of the present invention when applied to a substrate possesses color that matches the color of an associated substrate. As used herein and in the claims, the term "matches" or like terms when referring to color matching means that the color of the coating composition of the present invention substantially corresponds to a desired color or the color of an associated substrate. This can be visually observed, or confirmed using spectroscopy equipment. For example, the substrate may be a article of manufacture or structure. The article or structure may be a multi-layer coating composite comprising a pretreated substrate with various coating layers such as electrocoat, primer, base coat and clear coat. At least one of the base coat and clear coat may contain pigment and/or the clear coat may contain an adhesion promoter. It is believed that the addition of adhesion promoter to the clear coat may improve the adhesion between the clear coat and the coating composition applied thereover, although the inventors do not wish to be bound by any mechanism. In this embodiment, the coating composition of the present invention may be the reaction product of isocyanate and amine with a pigment additive. The coating composition of the present invention containing pigment may be applied to at least a portion of the article or structure. The color of the coated article or structure may match the color of an associated substrate. An "associated substrate" may refer to a substrate which comprises the article or structure but is not coated with the coating composition of the present invention; or a substrate which is attached, connected or in close proximity to the article or structure, but is not coated with the coating composition of the present invention.

The coating composition of the present invention may be at least partially applied to a wide variety of substrates or portions thereof, or used to form a component of a substrate. Non-limiting examples of uses as a coating or component may include but are not limited to roofing systems, sprayed or molded insulating material, tanks and pressure vessels, electrical equipment and components, garments and woven fiber, paper and packaging, sports equipment, paving material or pavement coating, HVAC and related equipment, agricultural and garden equipment, household appliances and the like. In further embodiments, the coating composition of the present invention may be applied as an under body protective coating in the wheel wells and surrounding or related areas of a vehicle; or to encapsulate a battery in a vehicle, particularly a military vehicle, to essentially preclude acid leakage and resulting damage to the vehicle underneath the battery; or to encapsulate printed wire boards; or as a chip resistant coating applied to the landing gear of an airplane to prevent chips from stones and rocks on the runway; or to provide chip resistance in general to a vehicle or portions thereof.

The following examples are intended to illustrate the invention, and should not be construed as limiting the invention in any way.

EXAMPLES

Polyurea compositions (Example 1 and 2) were produced by mixing a 1:1 volume ratio of the A-side components to the B-side components in a low pressure static mix tube device manufactured by Plas-Pak Industries, Incorporated. The ingredients for the A- and B-side components are shown in Table 1, for Examples 1 and 2.

The A-side was prepared as follows. IPDI, TERATHANE 650, 1,2-butanediol, and neopentyl glycol were mixed under nitrogen to form a prepolymer. A catalytic amount of dibutyl tin dilaurate (DBTL) was added and the mixture was stirred for 15 minutes. The reaction mixture was heated to a temperature of 40° C. and then to 100° C. The resulting prepolymer was cooled to a temperature of 80° C. and poured into 95% of the Desmodur N3400 and stirred for 15 minutes. Additional Desmodur N3400 was added to adjust the isocyanate equivalent weight. In Example 2, Fyrol PCF was then added.

The B-side components identified in Table 1 were premixed and charged into a holding chamber of the mixing device.

In Examples 1 and 2, the ratio of equivalents of isocyanate to amine was calculated as being 1.045 and 1.048, respectively.

TABLE 1

| Component | percent by weight | |
|---|---|---|
| | EX. 1 | EX. 2 |
| A-side | | |
| IPDI (diisocyanate) | 27.0 | 24.1 |
| DESMODUR N3400 (diisocyanate) | 49.7 | 45.0 |
| TERATHANE 650 | 20.9 | 18.7 |
| 1,2-butanediol | 1.2 | 1.1 |
| Neopentyl glycol | 1.2 | 1.1 |
| FYROL PCT (tris(2-chloropropyl)phosphate | 0 | 10.0 |
| B-side | | |

TABLE 1-continued

| Component | percent by weight | |
|---|---|---|
| | EX. 1 | EX. 2 |
| JEFFAMINE T-3000 (polyoxyalkylene primary amine) | 32.8 | 24.7 |
| DESMOPHEN NH 1220 (amine-functional aspartic acid ester) | 29.9 | 24.0 |
| JEFFLINK 754 (alicyclic secondary amine) | 30.2 | 28.5 |
| TINUVIN 292 (HALS) | 1.5 | 0.5 |
| TINUVIN 328 (benzotriole UV absorber) | 0.02 | 0.02 |
| BYK-9077 (polyacrylate) | 0.6 | 1.0 |
| FYROL PCF (tris(2-chloropropyl)phosphate) | 0 | 8.0 |
| OP-930 (aluminum phosphinic salt) | 0 | 10.0 |
| DABCO T-12 (dubutyl tin dilaurate) | 0.5 | 0.5 |
| VULCAN XC-72R (carbon black powder) | 1.2 | 1.2 |
| BENTONE (bentonite clay) | 3.25 | 1.6 |

The burning nature of the polyurea compositions produced in Examples 1 and 2 was each tested as follows. A 4×12 inch, 0.032 inch gauge steel panel was coated with 1.0 mil of ED-6750CA (available from PPG Industries, Inc.). The coated panel was cured by baking at a temperature of 350° F. for a period of 30 minutes. The cured panel was allowed to cool and the polyurea composition was then sprayed over the panel using a low pressure static mix tube spray gun which targeted 180-200 mils. The film was measured using an Elcometer 456 meter with F1/F2 dual probe manufactured by Elcometer Instruments, Ltd. The polyurea coated panel was allowed to cure at ambient temperature for 24 hours and then force cured for approximately 24 hours at a temperature of 140° F., and allowed to equilibrate at ambient conditions.

A fluted flat-wide spread torch nozzle (0.25×1.75 inch) was attached to a benzomatic propane tank. This torch head was selected because it was capable of burning a larger area on a panel than a typical pencil head-type torch tip. The flame size was adjusted such that an inner light-blue cone extended 0.25 inch beyond the leading metal edge of the torch head.

The panel was laid flat horizontally with the polyurea coated side facing up. The torch flame was pointed downwards approximately 30° off of plumb vertical and placed such that the inner blue cone of the torch flame was just above the coated surface. The polyurea coating was actively heated/burned with the flame for approximate 15 seconds and then the torch was removed. The time period during which the coating continued to have self-sustaining flame was measured. When the flame went out, the time was recorded. This process was repeated 3 more times on the same panel location (the portion that was previously heated/burned) and the time to self-extinguishing was recorded.

The period of time from when the torch flame was removed until the burning panel self-extinguished is shown in Table 2. The polyurea composition of Example 1 contained no flame retardant; after 200 seconds of burning unabated, the burning panel was extinguished. The polyurea composition of Example 2 contained flame retardant and it demonstrated good persistence of self-extinguishing properties.

TABLE 2

| | Example 1 | Example 2 |
|---|---|---|
| Film Build (panel avg.) | 187 mils | 188 mils |
| First Burn | 200+ seconds | 1 second |
| Second Burn | 200+ seconds | 2 seconds |
| Third Burn | 200+ seconds | 12 seconds |
| Fourth Burn | 200+ seconds | 5 seconds |

Whereas particular embodiments of this invention have been described above for purposes of illustration, it will be evident to those skilled in the art that numerous variations of the details of the present invention may be made without departing from the invention as defined in the claims.

Therefore, what is claimed is:

1. A coating composition comprising:
    (a) polyurea formed from a reaction mixture comprising an isocyanate-functional component and an amine-functional component wherein the ratio of equivalents of isocyanate groups to equivalents of amine groups is greater than 1 and the isocyanate-functional component and the amine-functional component can be applied to a substrate at a volume mixing ratio of 1:1, wherein at least 1 percent by weight of the isocyanate-functional component comprises at least one polyisocyanate monomer and wherein the isocyanate-functional component further comprises an isocyanate-functional polyisocyanate prepolymer which is a reaction product of a polyisocyanate and a polyol, and wherein the amine-functional component is selected from aliphatic polyamines, mono- and poly-acrylate and methacrylate modified amines, polyaspartic ester-based polyamines, and/or polyoxyalkylene amines;
    (b) polyurethane; and
    (c) a flame retardant component.

2. The coating composition of claim 1 wherein the polyurethane is formed in-situ.

3. The coating composition of claim 1 wherein the polyurethane is added to the isocyanate-functional component, the amine-functional component, or both.

4. The coating composition of claim 1, wherein the ratio of equivalents of isocyanate groups to equivalents of amine groups is 1.01 to 1.15:1.0.

5. The coating composition of claim 1, wherein the isocyanate-functional component comprises isophorone diisocyanate.

6. The coating composition of claim 1 wherein said flame retardant component comprises halogenated phosphate, halogen-free phosphate, tris(2-chloropropyl)phosphate, tris(2,3-dibromopropyl)phosphate, tris(1,3-dichloropropyl)phosphate, diammonium phosphate, powdered or fumed silica, layered silicate, aluminum hydroxide, brominated fire retardant, halogenated aromatic compound, antimony oxide, alumina trihydrate, metal borates, zinc borate, barium metaborate pentahydrate, phosphate esters, polyvinyl chloride, melamine cyanurate, melamine phosphates, polymelamine phosphates, melamine pyrophosphates, polymelamine pyrophosphates, melamine borate, other melamine derivatives, and combinations thereof.

7. The coating composition of claim 1, wherein the flame retardant component comprises a composition comprising at least one phosphinic salt of formula (I) and one diphosphinic salt of formula (II):

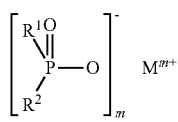
(I)

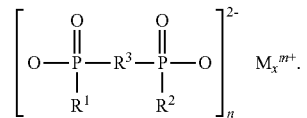
(II)

8. The coating composition of claim 1, wherein the flame retardant component is present in an amount such that it comprises from 5 to 35% by weight of the reaction mixture.

9. A coating composition comprising:
    (a) polyurea formed from a reaction mixture comprising an isocyanate-functional component and an amine-functional component wherein the ratio of equivalents of isocyanate groups to equivalents of amine groups is greater than 1 and the isocyanate-functional component and the amine-functional component can be applied to a substrate at a volume mixing ratio of 1:1, wherein at least 1 percent by weight of the isocyanate-functional component comprises at least one polyisocyanate monomer and wherein the isocyanate-functional component further comprises an isocyanate-functional polyisocyanate prepolymer which is a reaction product of a polyisocyanate and a polyol, and wherein the amine-functional component is selected from aliphatic polyamines, mono- and poly-acrylate and methacrylate modified amines, polyaspartic ester-based polyamines, and/or polyoxyalkylene amines; and
    (b) flame retardant.

10. The coating composition of claim 9, wherein the ratio of equivalents of isocyanate groups to equivalents of amine groups is 1.01 to 1.15:1.0.

11. The coating composition of claim 9, wherein the isocyanate-functional component comprises isophorone diisocyanate.

12. The coating composition of claim 9 wherein the flame retardant material comprises halogenated phosphate, halogen-free phosphate, tris(2-chloropropyl)phosphate, tris(2,3-dibromopropyl)phosphate, tris(1,3-dichloropropyl)phosphate, diammonium phosphate, powdered or fumed silica, layered silicate, aluminum hydroxide, brominated fire retardant, halogenated aromatic compound, antimony oxide, alumina trihydrate, metal borates, zinc borate, barium metaborate pentahydrate, phosphate esters, polyvinyl chloride, melamine cyanurate, melamine phosphates, polymelamine phosphates, melamine pyrophosphates, polymelamine pyrophosphates, melamine borate, other melamine derivatives, and combinations thereof.

13. The coating composition of claim 9 wherein the flame retardant component is a composition comprising at least one phosphinic salt of formula (I) and one diphosphinic salt of formula (II):

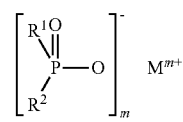
(I)

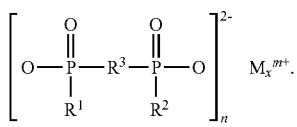

14. The coating composition of claim 9 wherein the flame retardant component is present in an amount such that it comprises 5 to 35% by weight of the reaction mixture.

15. A coated article comprising a substrate, a first layer deposited from a first composition applied over at least a portion of the substrate; and a second layer deposited from a second composition applied over at least a portion of the first layer, wherein at least one of the first composition and the second composition comprises the coating composition of claim 1.

16. A coated article comprising a substrate, a first layer deposited from a first composition applied over at least a portion of the substrate; and a second layer deposited from a second composition applied over at least a portion of the first layer, wherein at least one of the first composition and the second composition comprises the coating composition of claim 9.

17. A coated article, comprising:
 a substrate; and
 a coating layer formed by the coating composition of claim 1 deposited on at least a portion of the substrate.

18. A coated article, comprising:
 a substrate; and
 a coating layer formed by the coating composition of claim 9 deposited on at least a portion of the substrate.

19. The coated article of claim 16, wherein the substrate is at least a portion of a vehicle or structure.

20. A coated article comprising:
 a substrate; and
 a coating layer formed by the coating composition of claim 1 deposited on at least a portion of the substrate, further comprising a second layer comprising the coating composition of claim 1 applied over the coating layer to form a second layer and wherein the second layer has a surface texture greater than the surface texture of the coating layer.

21. A coated article comprising:
 a substrate; and
 a coating layer formed by the coating composition of claim 11 deposited on at least a portion of the substrate, further comprising a second layer comprising a coating composition comprising:

(a) polyurea formed from a reaction mixture comprising an isocyanate-functional component and an amine-functional component wherein the ratio of equivalents of isocyanate groups to equivalents of amine groups is greater than 1 and the isocyanate-functional component and the amine-functional component can be applied to a substrate at a volume mixing ratio of 1:1, wherein at least 1 percent by weight of the isocyanate-functional component comprises at least one polyisocyanate monomer and wherein the isocyanate-functional component further comprises an isocyanate-functional polyisocyanate prepolymer which is a reaction product of a polyisocyanate and a polyol, and wherein the amine-functional component is selected from aliphatic polyamines, mono- and poly-acrylate and methacrylate modified amines, polyaspartic ester-based polyamines, and/or polyoxyalkylene amines;
 (b) polyurethane; and
 (c) a flame retardant component;
wherein said second layer is applied over the coating layer to form a second layer and wherein the second layer has a surface texture greater than the surface texture of the coating layer.

22. A method of forming a coated article, comprising:
 providing a substrate; and
 applying a first layer deposited from a first composition, and applying a second layer deposited from a second composition over at least a portion of the first layer, at least one of the first composition and the second composition comprising the coating composition of claim 1.

23. A method of forming a coated article, comprising:
 providing a substrate; and
 applying a first layer deposited from a first composition, and applying a second layer deposited from a second composition over at least a portion of the first layer, at least one of the first composition and the second composition comprising the coating composition of claim 9.

24. The coating composition of claim 1, further comprising a filler that comprises a material selected from clay, silica or combinations thereof.

25. The polyurea coating composition of claim 9, further comprising a filler that comprises a material selected from clay, silica or combinations thereof.

26. A substrate at least partially coated with the coating composition of claim 1.

* * * * *